(12) United States Patent
Moll et al.

(10) Patent No.: US 8,042,218 B2
(45) Date of Patent: Oct. 25, 2011

(54) WIPER ASSEMBLY HAVING SIDE-SADDLE COUPLER

(75) Inventors: Kyle Moll, Oxford, MI (US); Rolando Lozano, Oxford, MI (US)

(73) Assignee: Trico Products Corporation, Rochester Hills, MI (US)

( * ) Notice: Subject to any disclaimer, the term of this patent is extended or adjusted under 35 U.S.C. 154(b) by 810 days.

(21) Appl. No.: 12/062,976

(22) Filed: Apr. 4, 2008

(65) Prior Publication Data

US 2008/0256740 A1 Oct. 23, 2008

Related U.S. Application Data

(60) Provisional application No. 60/921,986, filed on Apr. 5, 2007.

(51) Int. Cl.
*B60S 1/38* (2006.01)

(52) U.S. Cl. ........... 15/250.201; 15/250.001; 15/250.16; 15/250.3

(58) Field of Classification Search ............. 15/250.201, 15/250.001, 250.16, 250.3, 250.35, 250.43; *B60S 1/36*
See application file for complete search history.

(56) References Cited

U.S. PATENT DOCUMENTS

| | | | | |
|---|---|---|---|---|
| 2,974,341 A | 3/1961 | Hart | ............. | 15/250.32 |
| 3,179,969 A | 4/1965 | Glynn | ............. | 15/250.32 |
| 3,192,551 A | 7/1965 | Appel | ............. | 15/250.36 |
| 3,317,945 A | 5/1967 | Ludwig | ............. | 15/250.36 |
| 3,378,874 A | 4/1968 | Scinta | ............. | 15/250.32 |
| 3,418,679 A | 12/1968 | Barth et al. | ............. | 15/250.36 |
| 3,641,614 A | 2/1972 | Newsome | ............. | 15/250.32 |
| 3,845,519 A | 11/1974 | Quinlan et al. | ............. | 15/250.32 |
| 4,083,642 A | 4/1978 | Journee | ............. | 403/316 |
| 4,132,490 A | 1/1979 | Journee | ............. | 403/316 |
| 4,158,513 A | 6/1979 | Journee | ............. | 403/316 |
| 4,224,001 A | 9/1980 | Arndt et al. | ............. | 403/163 |
| 4,300,259 A * | 11/1981 | Maiocco | ............. | 15/250.32 |
| 4,416,032 A | 11/1983 | Mohnach et al. | ............. | 15/250.32 |

(Continued)

FOREIGN PATENT DOCUMENTS

DE 1 028 896 4/1958

(Continued)

OTHER PUBLICATIONS

May 15, 2008 Office Action for U.S. Appl. No. 11/016,597.

*Primary Examiner* — Monica Carter
*Assistant Examiner* — Michael Jennings
(74) *Attorney, Agent, or Firm* — Bliss McGlynn, P.C.

(57) ABSTRACT

A wiper assembly for use in connection with a wiper arm attachment member having a transversely extending pin and bent tab. The wiper assembly includes a wiping element and a superstructure having first and second longitudinal ends. The wiper assembly further includes first and second airfoils attached to the superstructure between an intermediate position and the longitudinal ends. The wiper assembly further includes a coupler attached to the superstructure and disposed between the first and second airfoils. The coupler includes first and second sidewalls, a deck that extends from the first sidewall and a rail that extends from the deck. The deck and rail of the wiper assembly cooperate to define a side-saddle that facilitates low-profile attachment to a wiper arm attachment member for reducing the likelihood of wind lift and lateral movement between the wiper arm attachment member and the wiper assembly.

16 Claims, 3 Drawing Sheets

U.S. PATENT DOCUMENTS

| | | | |
|---|---|---|---|
| 4,976,001 A * | 12/1990 | Wright | 15/250.48 |
| 4,980,944 A | 1/1991 | Longman | 15/250.32 |
| 5,084,933 A | 2/1992 | Buechele | 15/250.32 |
| 5,553,962 A | 9/1996 | Eustache | 403/154 |
| 5,606,765 A * | 3/1997 | Ding | 15/250.32 |
| 6,158,078 A | 12/2000 | Kotlarski | 15/250.32 |
| 6,434,780 B1 | 8/2002 | Kotlarski | 15/250.32 |
| 6,550,096 B1 | 4/2003 | Stewart et al. | 15/250.32 |
| 6,553,607 B1 * | 4/2003 | De Block | 15/250.32 |
| 6,581,237 B1 | 6/2003 | Kotlarski | 15/250.32 |
| 6,611,988 B1 | 9/2003 | De Block | 15/250.32 |
| 6,625,842 B1 | 9/2003 | De Block | 15/250.32 |
| 6,634,056 B1 | 10/2003 | De Block | 15/250.32 |
| 6,665,905 B2 | 12/2003 | Wegner et al. | 15/250.48 |
| 6,668,419 B1 | 12/2003 | Kotlarski | 15/250.43 |
| 6,687,948 B2 | 2/2004 | Kotlarski | 15/250.32 |
| 6,789,289 B2 | 9/2004 | Roodt | 15/250.32 |
| 6,792,644 B2 | 9/2004 | Roodt | 15/250.32 |
| 6,836,924 B2 | 1/2005 | Egan-Walter | 15/250.04 |
| 7,207,082 B2 * | 4/2007 | Lee | 15/250.32 |
| 7,353,562 B2 * | 4/2008 | Huang | 15/250.32 |
| 7,802,341 B2 * | 9/2010 | Cempura et al. | 15/250.32 |
| 7,921,504 B1 * | 4/2011 | Chiang | 15/250.46 |
| 2003/0159229 A1 | 8/2003 | Weiler et al. | 15/250.201 |
| 2004/0019997 A1 | 2/2004 | Baseotto et al. | 15/250.32 |
| 2004/0025281 A1 | 2/2004 | Baseotto et al. | 15/250.32 |
| 2004/0074037 A1 | 4/2004 | Op't Roodt | |
| 2004/0117938 A1 | 6/2004 | Wilms et al. | 15/250.32 |
| 2005/0251946 A1 | 11/2005 | Heinrich et al. | 15/250.32 |
| 2006/0130263 A1 * | 6/2006 | Coughlin | 15/250.32 |
| 2008/0092320 A1 * | 4/2008 | Cempura et al. | 15/250.201 |
| 2008/0235896 A1 * | 10/2008 | Cheng | 15/250.201 |

FOREIGN PATENT DOCUMENTS

| | | |
|---|---|---|
| DE | 1 505 397 | 10/1969 |
| DE | 1 655 410 | 8/1971 |
| DE | 26 40 399 | 3/1977 |
| DE | 197 29 865 A1 | 1/1999 |
| WO | WO 03/051696 | 6/2003 |

* cited by examiner

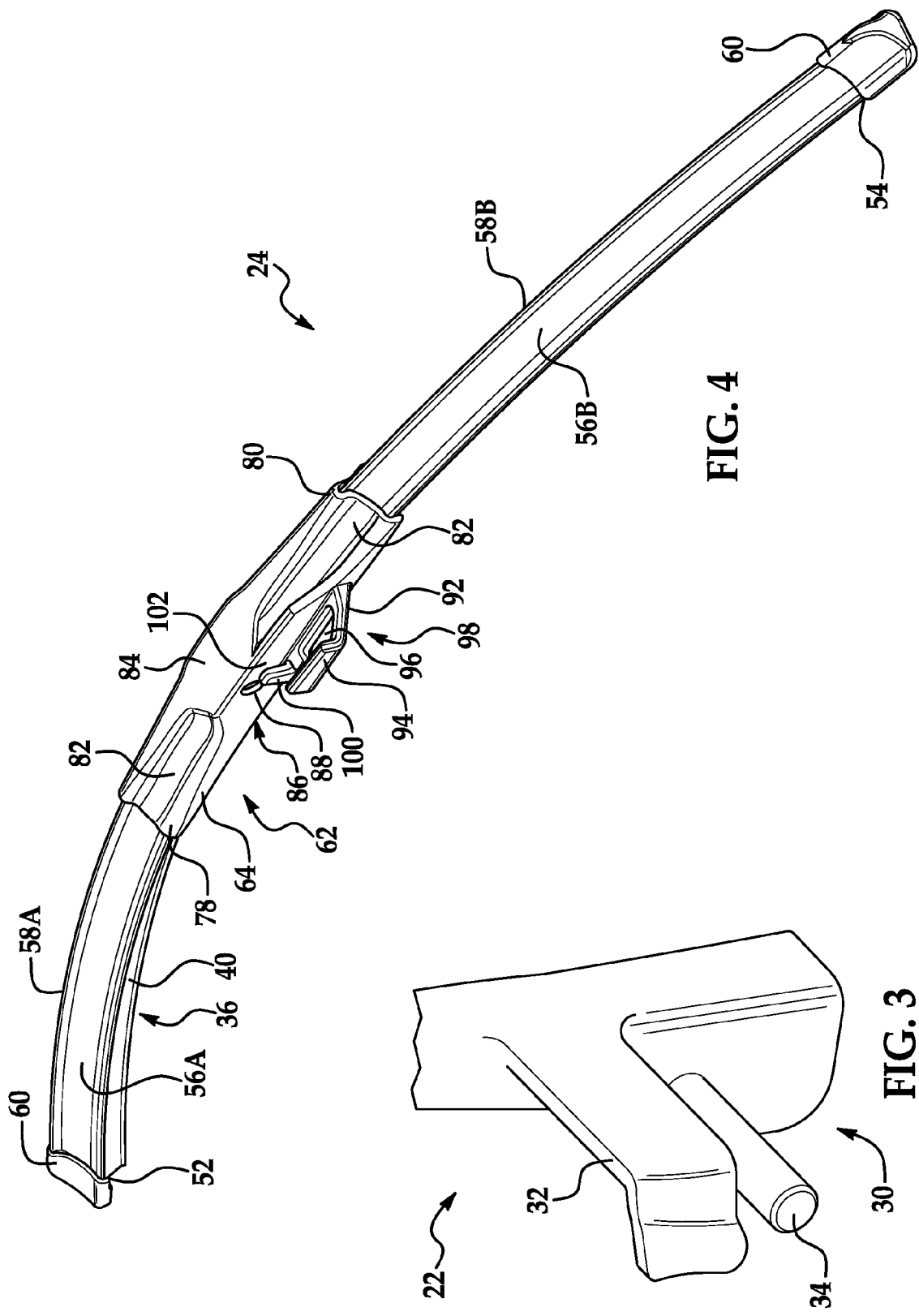

WIPER ASSEMBLY HAVING SIDE-SADDLE COUPLER

CROSS REFERENCE TO RELATED APPLICATIONS

This application claims the benefit of U.S. provisional patent application entitled "Wiper Assembly Having Side-Saddle Coupler," having Ser. No. 60/921,986, and filed on Apr. 5, 2007.

BACKGROUND OF THE INVENTION

1. Field of the Invention

The present invention relates, generally, to windshield wiper assemblies. More specifically, to a wiper assembly having a side-saddle coupler for use in connecting the wiper assembly to the wiper arm of a vehicle.

2. Description of the Related Art

Windshield wiper systems known in the related art typically include a wiper assembly having a wiping element that contacts the surface to be wiped and a wiper arm that imparts a reciprocating movement to the wiper assembly across the surface to be wiped. The wiper assembly is releasably connected to the wiper arm through a coupler. Conventional windshield wiper assemblies known in the related art generally consist of two types, commonly referred to as "beam blade-style windshield wiper assemblies" and "tournament-style windshield wiper assemblies." Tournament-style windshield wiper assemblies include a superstructure having a series of levers to distribute the downward force from the wiper arm across the wiping element. On the other hand, beam blade-style windshield wiper assemblies include a superstructure defined by an elongated, homogeneous strip forming a spring backbone or beam that is resiliently flexible. The beam is curved along a single plane that flexes to correspond to the curvature of a windshield.

Both types of windshield wiper assemblies rely on the downward force from the wiper arm to maintain contact between the wiping element and the windshield. Further, both types of windshield wiper assemblies generally include a coupler that is centrally disposed along the top surface of the wiper assembly such that the wiper assembly, coupler and wiper arm are stacked in a substantially vertical manner. Such wiper assemblies may be commonly referred to as "vertical-mount wiper assemblies." Vertical-mount wiper assemblies create a robust vertical profile that provides lateral stability during operational movement of the wiper assembly across the surface to be wiped, thereby reducing the likelihood of a wiper assembly skipping across the windshield, an undesirable action commonly referred to as "chatter."

However, the increased vertical profile of the wiper assembly elevates the proximity of the wiper arm relative to the windshield, which increases drag and wind lift. Wind lift occurs when airflow acts underneath the windshield wiper assembly and/or wiper arm creating a lift force that is greater than the opposing downward forces of the wiper arm and airflow over the wiper assembly. During wind lift, the wiper assembly lifts from the windshield of the vehicle, which can decrease the effectiveness of the windshield wiper assembly to clean the windshield. Additionally, the increased vertical profile of the wiper assembly and wiper arm may have an adverse effect on the overall aesthetics of a particular vehicle.

As a result of the functional and aesthetic issues surrounding vertical-mount wiper assemblies, airfoils of various designs have been employed to reduce wind lift and streamline appearance. Additionally, where wiper arms utilize a pin-style method of attachment, wiper assemblies have employed couplers that receive the pin along the sidewall. Such wiper assemblies are commonly referred to as, "side-mount wiper assemblies." Side-mount wiper assemblies provide a reduced vertical profile for improved styling and wind lift resistance and are available in both tournament and beam blade styles. However, side-mount wiper assemblies known in the art generally do not provide the lateral stability offered by the vertical-mount wiper assemblies.

Accordingly, while the wiper assemblies known in the art have generally worked for their intended purposes, there continues to be a need in the art for improvements in wiper assemblies that employ side-mount couplers. Thus, there is a need in the art for a wiper assembly having improved performance at variable vehicle speeds to reduce the likelihood of wind lift. There is also a need in the art for a wiper assembly having a reduced vertical profile while maintaining sufficient lateral stability.

SUMMARY OF THE INVENTION

The present invention overcomes many limitations and disadvantages in the related art in wiper assemblies. To this end, the wiper assembly of the present invention includes a wiping element adapted to contact the surface to be wiped and a superstructure operatively attached to the wiping element having first and second longitudinal ends. The wiper assembly further includes first and second airfoils operatively attached to the superstructure between an intermediate position and the longitudinal ends. The wiper assembly further includes a coupler operatively attached to the superstructure and disposed between the first and second airfoils. The coupler includes first and second sidewalls, a deck that extends outwardly from the first sidewall and a rail that extends vertically from the deck. The deck and rail of the wiper assembly cooperate to define a side-saddle that is adapted to facilitate low-profile attachment to a wiper arm attachment member to reduce the likelihood of windlift and reduce lateral movement of a wiper arm attachment member relative to the wiper assembly.

Thus, one advantage of the present invention is that the wiper assembly includes a coupler having a side-saddle that releasably connects to a wiper arm attachment member to provide improved wind lift resistance and maximize downward force to the wiper assembly.

Another advantage of the present invention is that the wiper assembly has a side-saddle coupler that efficiently utilizes the air current flowing over the assembly to maximize downward force applied to a wiper assembly, thereby reducing the likelihood of wind lift during operational movement across a surface to be wiped.

Still another advantage of the present invention is that it provides a wiper assembly having a side-saddle coupler that prevents excess lateral movement of the wiper assembly relative to the wiper arm, thereby reducing the likelihood of chatter during operational movement across the surface to be wiped.

BRIEF DESCRIPTION OF THE DRAWINGS

Other objects, features and advantages of the present invention will be readily appreciated as the same becomes better understood after reading the subsequent description taken in connection with the accompanying drawings, wherein:

FIG. 3 is a fragmentary view of the wiper arm of FIG. 2;

FIG. 4 is a perspective view of the wiper assembly of the present invention;

DETAILED DESCRIPTION OF THE PREFERRED EMBODIMENT(S)

Figure 1:
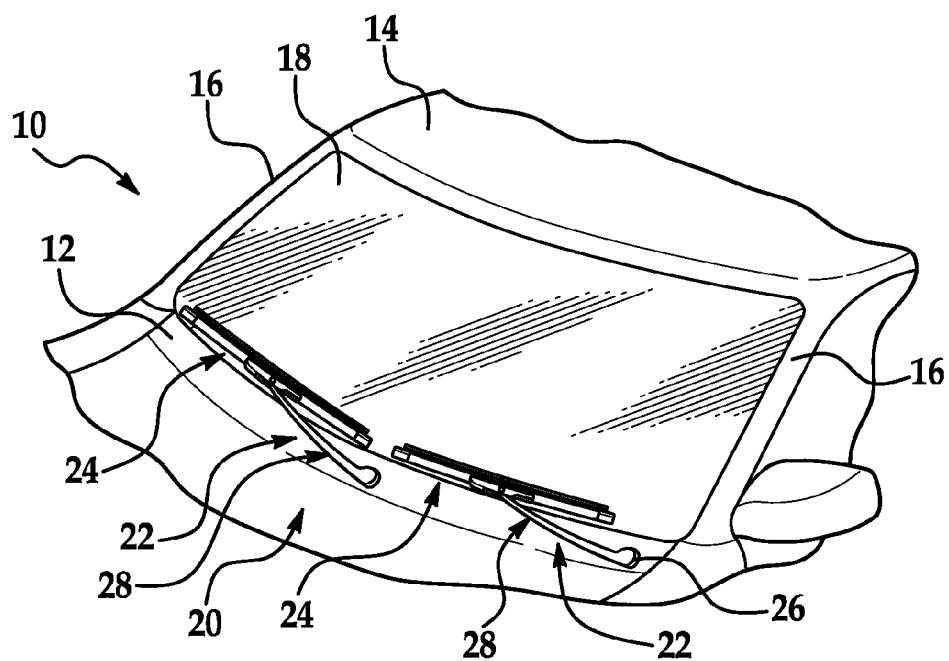
FIG. 1 is a partial perspective view of the front of an automotive vehicle having a pair of windshield wiper assemblies, in accordance with the present invention, that are pivotally mounted to wiper arms for reciprocal movement across the windshield of the vehicle.

Referring now to the Figures, where like numerals are used to designate like structure, a portion of a vehicle is schematically illustrated at 10 in FIG. 1. The vehicle includes a cowl 12, a roof 14, and a pair of laterally spaced front or "A" pillars 16 extending between the roof 14 and the cowl 12. The A-pillars, roof, and cowl cooperate to define a generally rectangular opening which supports a curved or "swept back" glass windshield 18.

A wiper system is generally indicated at 20 in FIG. 1 and is employed to clean the glass windshield 18. The wiper system 20 includes wiper arms, generally indicated at 22 and wiper assemblies of the present invention, generally indicated at 24, which correspond to the driver and passenger side of the vehicle 10. An electrical motor (not shown but generally known in the art) is employed to power the wiper system 20 and a drive linkage assembly (not shown but generally known in the art) may be employed to direct the wiper assemblies 24, via the wiper arms 22, across the windshield 18 in an oscillating manner.

Those having ordinary skill in the art will appreciate that while the wiper arms 22 and wiper assemblies 24 illustrated in FIG. 1 are shown in connection with the front windshield 18 of the vehicle 10, wiper arms 22 and wiper assemblies 24 of the present invention may be employed in other areas of a vehicle 10, such as a rear window (not shown) or a head lamp (not shown) that employs a wiper system 20. Thus, it will be understood that the present invention is not limited for use solely in connection with a vehicle's windshield 18, but for use in all applications where wiper arms 22 and wiper assemblies 24 are employed.

Figure 2:
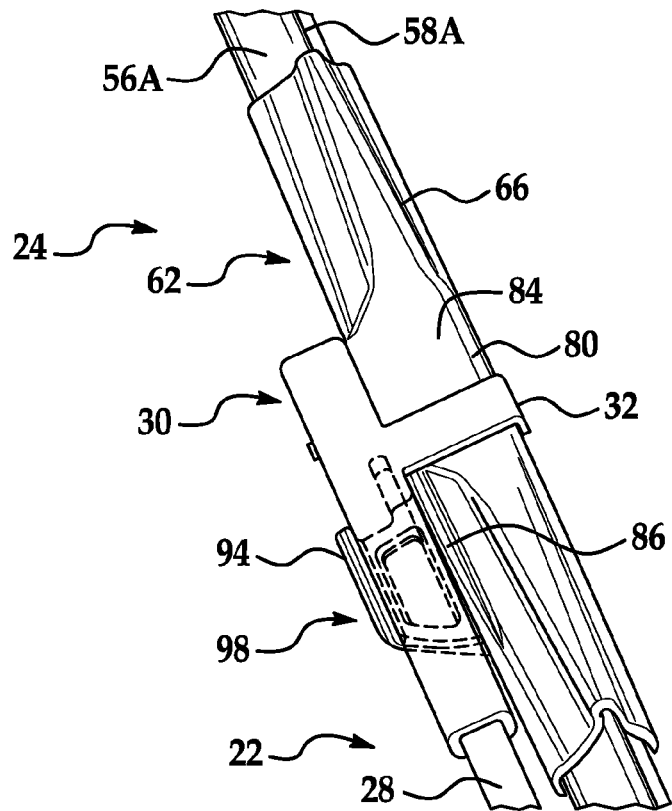
FIG. 2 is a fragmentary view of the wiper assembly in accordance with the present invention operatively attached to a wiper arm.

Referring to FIGS. 1 and 2, the wiper arm 22 includes a pivot end 26 that is pivotally attached to the drive assembly (not shown) of the wiper system 20 and an elongate body 28. The elongate body 28 is operatively attached to the pivot end 26 and extends transversely therefrom toward the wiper assembly 24. More specifically, the elongate body 28 is operatively attached to the pivot end 26 in a hinged manner to enable a person to elevate the elongate body 28 away from the surface to be wiped. Articulation between the pivot end 26 and elongate body 28 in this manner is conventionally known to enable maintenance or inspection of the wiper system 20 and/or windshield 18 as well as for removal and installation of wiper assemblies 24. Those having ordinary skill in the art will appreciate that the wiper arm 22 may further include a biasing member to impart a downward force through the wiper arm 22 and onto the wiper assembly 24 to facilitate contact between the wiper assembly 24 and the windshield 18 of the vehicle 10. By way of example, the biasing member may include a spring. It should further be appreciated that the elongate body 28 of the wiper arm 22 may include a cavity adjacent to the pivot end 26 to operatively receive the biasing member.

As shown in FIGS. 2 and 3, the wiper arm 22 further includes an attachment member, generally indicated at 30. The attachment member 30 is operatively attached to the elongate body 28 opposite the pivot end 26 and is adapted to releasably engage a wiper assembly 24. More specifically, the attachment member 30 is integrally attached to the elongate body 28. The attachment member 30 includes a bent tab 32 and a pin 34 disposed adjacent to the bent tab 32. The bent tab 32 and pin 34 extend transversely from the body 28 and parallel with respect to each other. The pin 34 and bent tab 32 cooperate to attach the wiper arm 22 to a wiper assembly 24, as will be described in greater detail below. Additionally, the pin 34 is adapted to operatively engage a portion of the wiper assembly 24 and provide an axis about which the wiper assembly 24 may be rotated, as will also be described in greater detail below.

Figure 6:
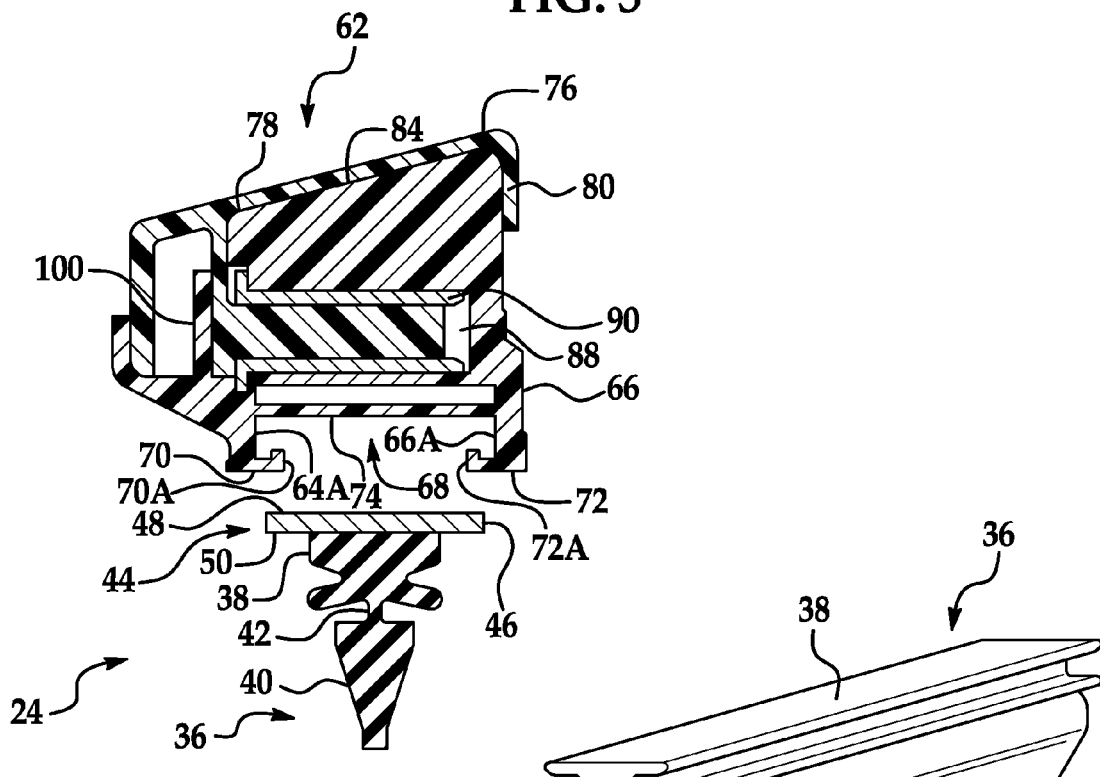
FIG. 6 is a cut-away, cross-sectional view of the wiper assembly of the present invention.
Figure 7:
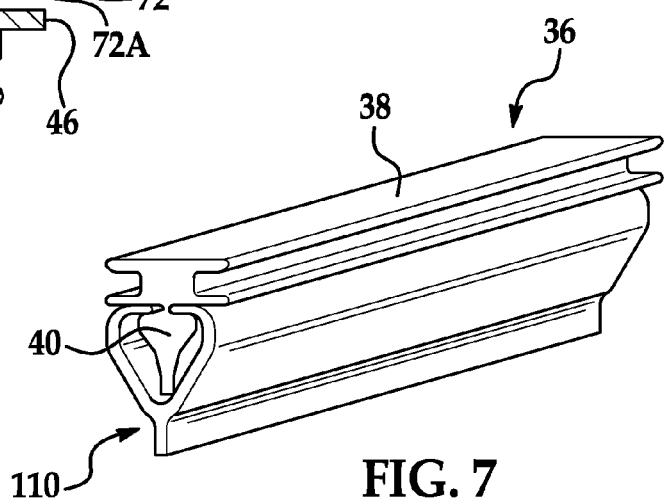
FIG. 7 is a fragmentary view of the wiping element and wiper guard of the present invention.

Referring to FIGS. 6 and 7, the wiper assembly 24 of the present invention includes a wiping element, generally indicated at 36. The wiping element 36 is adapted to contact the surface of the vehicle 10 to be wiped, namely the windshield 18, and includes an upper section 38 and a lower section 40 that are segmented by a longitudinally extending partition 42. The partition 42 provides flexibility between the upper section 38 and lower section 40 during operational movement of the wiper assembly 24. The upper section 38 is adapted to facilitate attachment to additional components of the wiper assembly 24, as described in greater detail below, while the lower section 40 is adapted to engage the surface to be wiped. The wiping element 36 includes a predetermined length corresponding to a particular application. It should be appreciated that the wiping element 36 is constructed from a flexible rubber material but other suitable materials and cross-sectional shapes may be employed without departing from the scope of the invention. By way of example, the wiping element 36 may be constructed from silicone. The wiping element 36 is typically manufactured through an extrusion process, which enables the length of the wiping element 36 to be easily adjusted without a substantial increase to manufacturing expense. However, those having ordinary skill in the art will appreciate that any commercially available manufacturing process such as injection molding may also be employed.

Referring specifically to FIG. 7, the windshield wiper assembly 24 of the present invention further includes a wiper guard, generally indicated at 110. The wiper guard 110 is releasably attached to the wiping element 36 and is adapted to prevent the wiping element 36 from contacting the windshield 18. The wiper guard 110 extends around the lower section 40 and releasably engages the wiping element 36 adjacent to the partition 42. More specifically, the wiper guard 110 encloses at least a portion of the lower section 40 to lift the wiping element 36 off of the surface to be wiped, thereby increasing the longevity of the wiping element 36.

As illustrated throughout FIGS. 1 and 6, the windshield wiper assembly 24 further includes a superstructure, generally indicated at 44, that operatively engages the wiping element 36. The superstructure 44 is adapted to distribute downward pressure from the wiper arm 22 across the wiping element. As a result, the superstructure 44 includes longitudinal ends 52 and 54 that define a predetermined length capable of facilitating distribution of the downward pressure of the wiper arm 22. In the embodiment illustrated in the figures, the superstructure 44 is an elongated beam, generally indicated at 46. Those having ordinary skill in the art will appreciate that the superstructure of the present invention may include multiple elongate beams or a tournament-style superstructure.

As shown in FIG. 6, the elongated beam 46 includes a super-surface 48 and a subsurface 50 that extend between first and second longitudinal ends 52 and 54, respectively. The elongated beam 46 is constructed from a resiliently flexible material, such as spring steel or a polymer, and is adapted to distribute force from an intermediate position toward the first and second longitudinal ends 52 and 54. More specifically, the elongated beam 46 receives force from the spring-loaded wiper arm 22 at an intermediate position and distributes this force across the span of the elongated beam 46 toward the first and second longitudinal ends 52 and 54. To that end, the elongated beam 46 is curved longitudinally with a predetermined radius of curvature parallel to the plane of curvature of the windshield 18 and is sometimes referred to in the related art as a "free form" radius of curvature (hereinafter "windshield curvature"). Accordingly, the curvature of the elongated beam 46 may be symmetrical or asymmetrical depending on the force requirements and the contour of the windshield 18. The flexible, free form, pre-curved beam straightens out when the wiper arm 22 applies a force thereto to flatten the beam 46 and directs the wiping element 36 to contact the windshield 18. Thus, the elongated beam 46 includes a free-form curvature that ensures force distribution on windshields 18 having various curvatures that effects proper wrapping about the windshield 18.

As shown in FIGS. 4 and 6, the elongated beam 46 has a substantially constant width and may have a constant thickness throughout the length between the first and second longitudinal ends 52 and 54. The constant width and thickness are adapted to provide high lateral and torsional stiffness to avoid lateral and torsional deflection, which causes the wiping element 36 to stick/slip ("chatter") on the windshield 18 during operation. Thus, the cross-section of the elongated beam 46 has a generally rectangular outer profile which makes the elongated beam 46 easier to manufacture. More specifically, where the elongated beam 46 is constructed from metal, such as spring steel, the tools and machinery used to manufacture the elongated beam 46 are less complicated than those required to manufacture elongated beams 46 having varying widths and/or thicknesses. Furthermore, where the elongated beam 46 is constructed from a polymer, such as a thermoplastic elastomer, the tools and extrusion process machinery are also less complicated than those employed to manufacture elongated beams 46 having varying widths and/or thicknesses. However, those having ordinary skill in the art will appreciate that the elongated beam 46 of the present invention may include a varying thickness and/or width without departing from the scope of the invention. By way of example, the width and/or thickness of the elongated beam 46 may taper linearly from the beam center, sinusoidally, parabolically, or asymmetrically. Additionally, although the elongated beam 46 is illustrated throughout the figures as a single, integral piece of material such that it defines a consolidated cross-section, those having ordinary skill in the art will appreciate that the elongated beam 46 may be formed into a single piece by a plurality of laminates.

Figure 5:
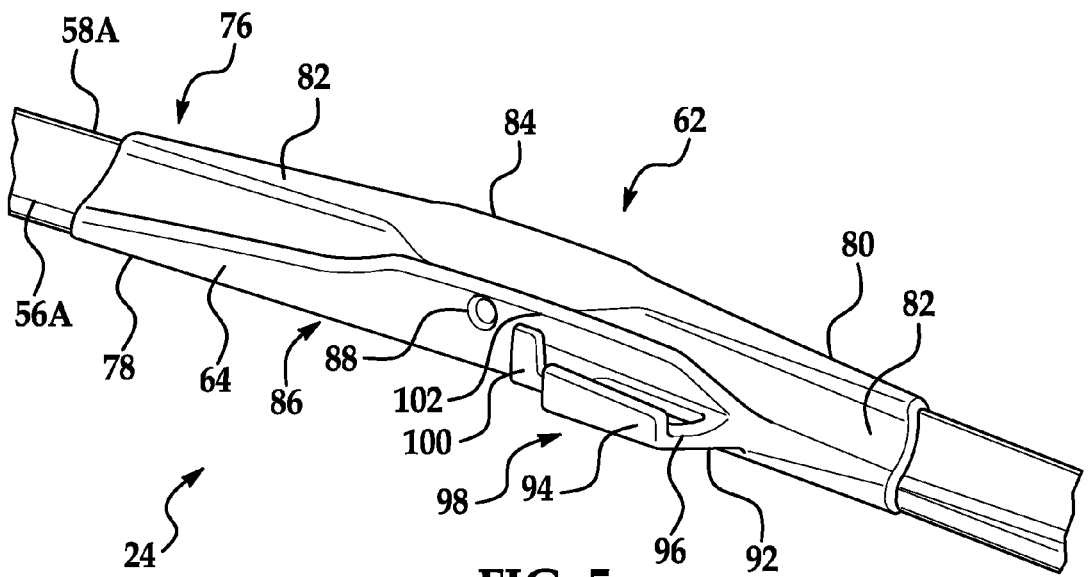
FIG. 5 is a fragmentary view of the wiper assembly of the present invention.

Referring now to FIGS. 4 and 5, the wiper assembly 24 includes additional structure to improve wind lift resistance. More specifically, and as best shown in FIG. 4, the wiper assembly 24 may include first and second airfoils 56A and 56B disposed between an intermediate position and the longitudinal ends 52 and 54. The airfoils 56A and 56B act to reduce the likelihood of wind lift by efficiently utilizing airflow to generate downward force on to the wiper assembly 24.

The airfoils 56A and 56B include a contoured profile that tapers inwardly from the superstructure 44 toward a terminal point 58A and 58B. The airfoils 56A and 56B include an asymmetrical cross-sectional profile (FIG. 3). The airfoils 56A and 56B are manufactured from a thermoplastic material, as described above relative to the wiping element 36, and are operatively attached to the super-surface 48 of the elongated beam 46. Those having ordinary skill in the art will appreciate that the airfoils 56A and 56B may be attached to the elongated beam 46 by an adhesive, ultrasonic welding, or by structure, such as tongue and groove or dovetail configuration the airfoils 56A and 56B and the superstructure 44.

With continuing reference to FIG. 4, the wiper assembly 24 of the present invention further includes a pair of end caps, generally indicated at 60. The end caps 60 are adapted to operatively engage the longitudinal ends 52 and 54. The end caps 60 include a profile that is substantially similar to the contoured profile of the air foils 56A and 56B to provide improved wind lift characteristics and increased aesthetics. A portion of the end caps 60 extends beyond the longitudinal ends 52 and 54 to facilitate contact between the outer extremities of the wiping element 36 and the surface to be wiped.

The wiper assembly 24 further includes a coupler, generally indicated at 62, that is disposed along an intermediate position between the first and second airfoils 56A and 56B. Contrary to conventional beam blade-style wiper assemblies, which include a small contact point through which force from the wiper arm 22 is distributed, the coupler 62 of the present invention broadens the initial point through which force is applied from the wiper arm 22 to the elongated beam 46. In this manner, the downward force from the wiper arm 22 is distributed with more efficiency across the elongated beam 46, thereby reducing the likelihood of wind lift and improving wiping action.

Referring to FIGS. 2 and 4-6, the coupler 62 includes opposed first and second sidewalls 64 and 66, respectively, each having an interior surface 64A and 66A. The interior surfaces 64A and 66A cooperate to define a track, generally indicated at 68, that operatively receives an intermediate portion of the elongated beam 46. Each of the interior surfaces 64A and 66A further include at least two transversely extending tangs 70, 72 that engage the subsurface 50 of the elongated beam 46. At least one of the tangs 70, 72 on each of the interior surfaces 64A, 66A further include a flange 70A, 72A that restricts the axial movement of the elongated beam 46 relative to the coupler 62. It should be appreciated that the elongated beam 46 includes notches or apertures (not shown) that are adapted to receive the flanges 70A, 72A. It should further be appreciated that the tangs 70, 72 are operatively disposed adjacent to the terminal ends of the coupler 62 to accommodate the resiliency of the elongated beam 46.

Additionally, the coupler 62 includes at least two bridges 74 disposed above the tangs 70, 72. The bridges 74 operatively connect the interior surfaces 64A, 66A and prevent vertical movement of the elongated beam 46 relative to the tangs 70, 72. In this manner, a portion of the elongated beam 46 is retained within the track 68, but remains able to flex in response to the curvature of the surface to be wiped. Those having ordinary skill in the art will appreciate that the elongated beam 46 may be operatively attached to the coupler 62 by several methods other than as described above. By way of example, the coupler 62 may be fixed by adhesive, riveted or welded to the elongated beam 46.

The coupler 62 further includes a top surface, generally indicated at 76, that is disposed between the first and second sidewalls 64 and 66, respectively. The top surface 76 cooperates with the first sidewall 64 to define a facing edge 78 and further cooperates with the second sidewall 66 to define a terminal edge 80. The top surface 76 is contoured to define an airfoil 82 between the facing edge 78 and the terminal edge 80 that is adapted to reduce the likelihood of wind lift during operational movement across a surface to be wiped. More specifically, the airfoil 82 defined within the coupler 62 substantially mimics the profile of the airfoils 56A and 56B described above. Those having ordinary skill in the art will appreciate that while the top surface 76 is contoured to define an airfoil 82 to reduce the likelihood of wind lift, the top surface 76 may include other undulations to accomplish the intended objective. By way of example, the top surface 76 may extend from the facing edge 78 toward the terminal edge 80 along a substantially planar incline in a manner that efficiently utilizes airflow to increase the downward force on the wiper assembly 24 to reduce the likelihood of wind lift.

The top surface 76 further includes a land 84 that is adapted to receive the bent tab 32 of the wiper arm attachment member 30 when the wiper assembly 24 is releasably attached to the wiper arm 22. The land 84 is a substantially planar section that extends from the facing edge 78 toward the terminal edge 80 along a predetermined angle to further reduce the likelihood of wind lift. The predetermined angle of the land 84 is adapted to correspond to the angle of the bent tab 32 (FIG. 6). However, those having ordinary skill in the art will appreciate that the land 84 may include any predetermined angle which may or may not correspond to the angle of the bent tab 32. By way of example, the land 84 may extend from the facing edge 78 to the terminal edge 80 in a manner that is coplanar with the transversely extending pin 34 of the wiper arm attachment member 30.

Referring back to FIGS. 4 and 5, the coupler 62 further includes a panel, generally indicated at 86. The panel 86 is integrated within the first sidewall 64 and is adapted to facilitate retention of a portion of the wiper arm attachment member 30. More specifically, the panel 86 is adapted to prevent lateral movement of the wiper assembly 24 relative to the wiper arm 22. The panel 86 includes a bore 88 defined therein that is adapted to receive the transversely extending pin 34 of the attachment member 30 of a wiper arm 22. More specifically, the bore 88 provides a surface about which the transversely extending pin 34 rotates during installation of the wiper assembly 24 to the wiper arm 22, as described in greater detail below. Those having ordinary skill in the art will appreciate that the coupler 62 may further include a sleeve 90 disposed within the bore 88 to provide wear and rotational properties relative to the rotation of the pin 34.

The coupler 62 further includes a deck 92 that extends transversely from the panel 86. The deck 92 includes a rail 94 that extends vertically from the deck 92, parallel to the panel 86. The deck 92 further includes an aperture 96 defined therein. However those having ordinary skill in the art will appreciate that the deck 92 may be of solid construction without departing from the scope of the invention. Further by way of example, the deck 92 and the rail 94 may include bifurcated configurations such that there are two decks and two rails cooperating to retain a portion of the wiper arm attachment member 30.

As shown in FIG. 4, the panel 86, deck 92 and rail 94 cooperate to define a side-saddle, generally indicated at 98. The side-saddle 98 is adapted to operatively receive a portion of the wiper arm attachment member 30. More specifically, the side-saddle 98 is adapted to restrict the lateral movement of the wiper assembly 24 relative to the wiper arm 22 during operational movement across a surface to be wiped. The side-saddle 98 further includes a pillar 100 that extends vertically from the deck 92, and substantially parallel to the panel 86. The pillar 100 is operatively disposed between the panel 86 and the rail 94 and adjacent to the bore 88 and cooperates with the panel 86 to define a slot 102 that is adapted to receive a portion of the wiper arm attachment member 30. The pillar 100 provides the wiper assembly 24 with additional retention properties to further prevent lateral movement while maintaining a low vertical profile relative to the surface to be wiped.

During inspection or replacement of a wiper assembly 24, the wiper arm 22 is often pivoted about the pivot end 26, such that the elongate body 28 is elevated from an initial position substantially parallel to the plane of a windshield 18 to an elevated position that is substantially perpendicular relative to the plane of a windshield 18. The wiper assembly is then rotated about the pin 34 such that a portion of the attachment member 30 disposed within the side-saddle 98 is removed therefrom. Additionally, rotation about the pivot pin 34 disengages the bent tab 32 from the land 84.

During installation/removal of a wiper assembly 24 onto/from a wiper arm 22, the wiper assembly 24 is properly rotated when the land 84 contacts the bent tab 32 in a substantially perpendicular manner. Accordingly, the land 84 provides a positive stop to prevent excess rotation of the wiper assembly 24 relative to the wiper arm 22 and facilitates proper alignment between the bore 88 and the transversely extending pin 34 of the wiper arm 22. Once the pin 34 is seated within the bore 88, the wiper assembly 24 may be rotated to affect operative engagement between the bent tab 32 and the land 84 as well as a portion of the wiper arm attachment member 30 and the side-saddle 98.

Those having ordinary skill in the art will appreciate that while the present invention is shown in connection with a beam-style superstructure 44, it is not limited to such construction. By way of example, the superstructure may include what is commonly referred to as a "tournament" style superstructure. A wiper assembly of the present invention having a tournament-style superstructure includes a primary lever, two secondary levers and a series of tertiary levers. The secondary levers are articulated to the primary lever at pivot points located at the opposed, lateral ends of the primary lever. Likewise, the tertiary levers are each articulated to a secondary lever at pivot points located at the opposed lateral ends of the secondary levers. However, those of ordinary skill in the art will appreciate that the superstructure may include a number of different configurations without departing from the scope of the invention.

Where a tournament-style superstructure is employed, the coupler is operatively attached to the primary lever adapted to releasably connect to the wiper arm attachment member in the above-described manner relative to the beam blade-style superstructure. Furthermore, the primary lever may include the airfoil as discussed above relative to a beam blade-style superstructure and the tertiary levers operatively engage the wiper element. Given that the wiper element is virtually in constant contact with the windshield, it will likely wear prior to the other components of the wiper assembly. As a result, the wiper element may be removable where the tournament-style superstructure is employed in order that it may be replaced when worn.

The present invention provides a wiper assembly 24 including a coupler 62 having a side-saddle 98 that releasably connects to a wiper arm 22. Accordingly, the wiper assembly 24 of the present invention provides a reduced vertical profile for improved wind lift resistance. The present invention further includes a wiper assembly 24 having a coupler 62 that includes a contoured top surface 76 to efficiently utilize air current to maximize downward force applied to a wiper assembly 24. Accordingly, the wiper assembly 24 reduces the likelihood of wind lift during operational movement across a surface to be wiped. The present invention also includes a coupler 62 having a side-saddle 98 that prevents lateral movement of the wiper assembly 24 relative to the wiper arm 22. Accordingly, the wiper assembly 24 of the present invention reduces the likelihood of chatter across the surface to be wiped due to inadequate lateral support relative to a wiper arm 22.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A wiper assembly for use in connection with a wiper arm having an attachment member including a transversely extending pin and a bent tab, said wiper assembly comprising:
   a wiping element adapted to contact the surface to be wiped;
   a superstructure operatively attached to said wiping element having first and second longitudinal ends and defining a longitudinal axis;
   at least one airfoil operatively attached to said superstructure that is adapted generate downward force to reduce the likelihood of wind lift; and
   a coupler operatively attached to said superstructure at an intermediate position between said longitudinal ends, said coupler having first and second sidewalls, a deck that extends outwardly from said first sidewall and laterally relative to said longitudinal axis and a rail that extends vertically from said deck and laterally spaced from said longitudinal axis, said coupler further including a panel defined by said sidewall, said panel having a bore defined therein that is adapted to receive the pin of a wiper arm attachment member, and a pillar that extends generally vertically upward from said deck between said panel and said rail, said pillar and said panel cooperating to define a slot that is adapted to receive a portion of the wiper arm attachment member in a position laterally spaced from said longitudinal axis to reduce the likelihood of lateral movement of the wiper arm attachment member relative to said coupler;
   wherein said deck and said rail cooperate to define a laterally spaced side-saddle that is adapted to facilitate low-profile attachment to a wiper arm attachment member to reduce the likelihood of windlift and reduce lateral movement of a wiper arm attachment member relative to said coupler.

2. The wiper assembly as set forth in claim 1 wherein said first and second sidewalls of said coupler each further include opposed interior surfaces that cooperate to define a track that operatively engages an intermediate portion of said superstructure to facilitate distribution of downward force from a wiper arm toward said longitudinal ends to reduce the likelihood of wind lift.

3. The wiper assembly as set forth in claim 1 further includes a wiper guard releasably attached to said wiping element that is adapted to prevent said wiping element from contacting a surface to be wiped.

4. The wiper assembly as set forth in claim 1 wherein the superstructure includes an elongated beam that is adapted to distribute force from a wiper arm through said coupler and toward said first and second longitudinal ends.

5. The wiper assembly as set forth in claim 1 wherein said at least one airfoil includes first and second airfoils disposed between said coupler and said longitudinal ends, said first and second airfoils having a contoured profile that tapers inwardly from said superstructure toward a terminal point to define an asymmetrical cross-section.

6. The wiper assembly as set forth in claim 1 further includes a pair of end caps that are adapted to operatively engage said longitudinal ends of said superstructure, said end caps include an asymmetrical cross-sectional profile that corresponds to the profile of said at least one airfoil and extend beyond said longitudinal ends to facilitate contact between the outer extremities of said wiping element and the surface to be wiped to reduce the likelihood of wind lift.

7. A wiper assembly for use in connection with a wiper arm having an attachment member including a transversely extending pin and a bent tab, said wiper assembly comprising:
   a wiping element adapted to contact the surface to be wiped;
   a superstructure operatively attached to said wiping element having first and second longitudinal ends, said superstructure defined by an elongated beam that is adapted to distribute force from a wiper arm toward said first and second longitudinal ends and defining a longitudinal axis;
   at least one airfoil operatively attached to said elongated beam that is adapted to generate downward force to reduce the likelihood of wind lift; and
   a coupler operatively attached to said elongated beam at an intermediate position between said longitudinal ends, said coupler having first and second sidewalls, a deck that extends outwardly from said first sidewall and laterally relative to said longitudinal axis and a rail that extends vertically from said deck and laterally spaced from said longitudinal axis, said coupler further including a panel defined by said sidewall, said panel having a bore defined therein that is adapted to receive the pin of a wiper arm attachment member, and a pillar that extends generally vertically upward from said deck between said panel and said rail, said pillar and said panel cooperating to define a slot that is adapted to receive a portion of the wiper arm attachment member in a position laterally spaced from said longitudinal axis to reduce the likelihood of lateral movement of the wiper arm attachment member relative to said coupler;
   wherein said deck and said rail cooperate to define a laterally spaced side-saddle that is adapted to facilitate low-profile attachment to a wiper arm attachment member to reduce the likelihood of wind lift and reduce lateral movement of a wiper arm attachment member relative to said coupler.

8. The wiper assembly as set forth in claim 7 further includes a wiper guard releasably attached to said wiping element that is adapted to prevent said wiping element from contacting the surface to be wiped.

9. The wiper assembly as set forth in claim 7 wherein said at least one airfoil includes first and second airfoils disposed between said coupler and said longitudinal ends, said first and second airfoils having a contoured profile that tapers inwardly from said superstructure toward a terminal point to define an asymmetrical cross-section.

10. The wiper assembly as set forth in claim 7 further includes a pair of end caps that are adapted to operatively engage said longitudinal ends of said superstructure, said end caps include an asymmetrical cross-sectional profile that corresponds to the profile of said at least one airfoil and extend beyond said longitudinal ends to facilitate contact between the outer extremities of said wiping element and the surface to be wiped to reduce the likelihood of wind lift.

11. The wiper assembly as set forth in claim 7 wherein said first and second sidewalls of said coupler each further include opposed interior surfaces that cooperate to define a track that operatively receives an intermediate portion of said elongated beam, each of said interior surfaces having at least two transversely extending tangs operatively disposed adjacent to the terminal ends of said coupler.

12. The wiper assembly as set forth in claim 11 wherein said coupler further includes at least two bridges disposed above said tangs that operatively connect said interior surfaces, said bridges and said tangs cooperate to retain said elongated beam within said track while maintaining the resiliency of said elongated beam within said track.

13. The wiper assembly as set forth in claim 7 wherein said coupler further includes a top surface disposed between said first and second sidewalls, said top surface includes a contoured profile that defines an airfoil to reduce the likelihood of wind lift during operational movement across a surface to be wiped.

14. A wiper assembly for use in connection with a wiper arm having an attachment member including a transversely extending pin and a bent tab, said wiper assembly comprising:
  a wiping element adapted to contact the surface to be wiped;
  a superstructure operatively attached to said wiping element having first and second longitudinal ends, said superstructure defined by an elongated beam that is adapted to distribute force from a wiper arm toward said first and second longitudinal ends and defining a longitudinal axis;
  at least one airfoil operatively attached to said elongated beam that is adapted generate downward force to reduce the likelihood of wind lift;
  a coupler operatively attached to said elongated beam at an intermediate position between said longitudinal ends, said coupler having first and second sidewalls and a side-saddle disposed adjacent to said first sidewall, said first sidewall including a bore defined therein to receive the transversely extending pin of a wiper arm attachment member, said side-saddle having at least one deck that extends outwardly from said first sidewall laterally relative to said longitudinal axis and at least one rail that extends vertically from said at least one deck and laterally spaced from said longitudinal axis, said coupler further including a panel defined by said sidewall, said panel having a bore defined therein that is adapted to receive the pin of a wiper arm attachment member, and a pillar that extends generally vertically upward from said deck between said panel and said rail, said pillar and said panel cooperating to define a slot that is adapted to receive a portion of the wiper arm attachment member in a position laterally spaced from said longitudinal axis to reduce the likelihood of lateral movement of the wiper arm attachment member relative to said coupler;
  wherein said laterally spaced side-saddle cooperates with said first and second sidewalls to facilitate low-profile attachment to a wiper arm attachment member to reduce the likelihood of windlift and reduce lateral movement of a wiper arm attachment member relative to said coupler.

15. The wiper assembly as set forth in claim 14 wherein said first and second sidewalls of said coupler each further include opposed interior surfaces that cooperate to define a track that operatively receives an intermediate portion of said elongated beam, each of said interior surfaces having at least two transversely extending tangs operatively disposed adjacent to the terminal ends of said coupler.

16. The wiper assembly as set forth in claim 15 wherein said coupler further includes at least two bridges disposed above said tangs that operatively connect said interior surfaces, said bridges and said tangs cooperate to retain said elongated beam within said track while maintaining the resiliency of said elongated beam within said track.

* * * * *